Patented Sept. 2, 1924.

1,507,029

UNITED STATES PATENT OFFICE.

ROBERT W. PRITTIE, OF TORONTO, ONTARIO, CANADA.

VERMIN EXTERMINATOR.

No Drawing.     Application filed December 30, 1920. Serial No. 434,171.

*To all whom it may concern:*

Be it known that I, ROBERT W. PRITTIE, a citizen of Canada, residing in Toronto, in the Province of Ontario, Dominion of Canada, have invented new and useful Improvements in Vermin Exterminators, of which the following is a specification.

This invention relates to a vermin exterminating compound and more particularly to a preparation which is designed to be eaten by rats and cause the death of the same by poisoning.

It is the object of this invention to produce a compound of this character which is very attractive to rats and cause the same to eat freely thereof; which has a very rapid poisoning effect on rats but operates as an emetic on dogs, cats and the like and also on human beings if the same is eaten by the same accidentally; and which dries out the decayable tissues of the rat and leaves only the non-decaying matter of the same in a mummified form so that no objectionable odors or septic conditions occur when a rat is destroyed by this preparation.

This improved vermin exterminator comprises the following ingredients and quantities:

| | Parts. |
|---|---|
| Phosphorus | 7 |
| Carbon bisulphide | 6 |
| Water | 162 |
| Flour | 80 |
| Glucose | 175 |
| Glycerin | 64 |
| Tartar emetic | 35 |
| Oil of anise | 4 |
| Caramel | 4 |

In compounding these ingredients a paste is formed by mixing 80 parts of flour, 175 parts of glucose, and 150 parts of water, then adding thereto 35 parts of tartar emetic, and then boiling this mass until the same is thoroughly heated and the parts effectively commingled.

To 6 parts of carbon bisulphide are now added 12 parts of water for dissolving the former, then 7 parts of phosphorus are added thereto and then 64 parts of glycerin are added to the mass after which the same is thoroughly mixed.

This mixture of carbon bisulphide, glycerin, phosphorus and water is now stirred into the above described paste made of flour, glucose, water and tartar emetic, and when the mixture has cooled there are then added to the same 4 parts of oil of anise and 4 parts of caramel which completes the mixture.

Care must be taken to keep the phosphorus and carbon bisulphide away from heat and flame on account of their inflammable character. The tartar emetic is the commonly known mixture of antimony and potassium which, aside from giving the preparation a good consistency for spreading on bread or other bait, also serves as an emetic in case the preparation is eaten accidentally by dogs, cats or human beings, but as rats cannot vomit the same, it operates as a poison on them. The phosphorus in the mixture operates to dry out, mummify, or convert into an antiseptic condition the flesh and bones of the body of the rats, leaving only the skins which produce no odor or disease as is commonly the case with ordinary poisons. The carbon bisulphide operates as a solvent for the phosphorus and later evaporates out of the mixture. The water is added to the carbon bisulphide and phosphorus to prevent evaporation and also avoid hazard for the time being while the phosphorus is being handled.

The presence of glycerin in the mixture has the effect of holding the phosphorus in solution, also to prevent oxygenation of the phosphorus and thus avoid danger of fire at any time from the phosphorus, and it also supplies a certain amount of sweetening and other properties which have the effect of attracting the rats.

The mixture of flour, water and glucose makes a paste of which the rats are very fond and which is of the proper consistency to form a vehicle in which the poisonous ingredients are concealed without detection. The primary function of the oil of anise is to attract the rats, while caramel, commonly known as burnt sugar, also functions as a lure on account of its edibility and as a coloring agent which appeals to the taste of rats.

It has been found in actual practice that rats and similar vermin will eat this compound in preference to the higher grades of food commonly consumed by human beings, such as fresh eggs and cheese, this being due to the particular ingredients which are very attractive to the taste of rats.

After the rat has eaten of the compound, it cannot throw the same off, but will die wherever overtaken by the poison, and gradually yield to the curing effect of the phosphorus until the flesh and bones are dried out and nothing is left but the pelt without odor or liability of breeding disease.

I claim as my invention:

1. A compound for exterminating vermin including phosphorus, glycerine, tartar emetic, and a vehicle.

2. A compound for exterminating vermin including phosphorus, glycerine, carbon bisulphide, tartar emetic, caramel and a vehicle.

ROBERT W. PRITTIE.